United States Patent [19]

Becker et al.

[11] Patent Number: 5,677,379

[45] Date of Patent: Oct. 14, 1997

[54] β-KETO-ESTER-ESTERIFIED POLYOL WITH POLYMERIZED MONOMERS

[75] Inventors: Heinz-Dietholf Becker, Bonn; Gerhard Bremer, Frechen; Carmen Flosbach, Wuppertal; Hermann Kerber, Wuppertal; Walter Schubert, Wuppertal; Werner Stephan, Wuppertal; Jörg Wabbels, Hattingen, all of Germany

[73] Assignee: Herberts Gesellschaft mit beschrankter Haftung, Wuppertal, Germany

[21] Appl. No.: 575,507

[22] Filed: Dec. 20, 1995

[30] Foreign Application Priority Data

Dec. 24, 1994 [DE] Germany .............. 44 46 770.2
Sep. 6, 1995 [DE] Germany .............. 195 32 873.6

[51] Int. Cl.⁶ .............. C08L 25/14; C08L 33/14
[52] U.S. Cl. .............. 525/101; 523/408; 523/411; 523/412; 523/437; 523/514
[58] Field of Search .............. 525/101; 523/408, 523/411, 412, 437, 514

[56] References Cited

U.S. PATENT DOCUMENTS

| | | | |
|---|---|---|---|
| 4,871,822 | 10/1989 | Brindöpke et al. | 526/318.2 |
| 5,081,183 | 1/1992 | Kei et al. | 525/61 |
| 5,288,802 | 2/1994 | Walters et al. | 525/113 |
| 5,426,151 | 6/1995 | Brandt et al. | 525/100 |
| 5,430,107 | 7/1995 | Bederke et al. | 525/300 |

*Primary Examiner*—Robert E. Sellers
*Attorney, Agent, or Firm*—Merchant & Gould Smith, Edell, Welter & Schmidt

[57] ABSTRACT

A binder composition for coating agents contains $A_1$) C—H-acid compounds obtainable by polymerization of hydroxyfunctional and non-hydroxyfunctional monomers, polyols and β-keto carboxylic acid esters and subsequent esterification of the hydroxy groups with the β-keto carboxylic acid esters, $A_2$) C—H-acid compounds obtainable by transesterification of polyols with β-keto carboxylic acid esters, α,β-unsaturated compounds with at least two groups having the formula $R_1R_2C=CR_3—CO—$ bonded to at least one additional group $R_1R_2C=CR_3—CO—$ via the radical of a polyalcohol, polyamine or amino alcohol, C) polyglycidyl compound, D) polyamine hardeners, E) Lewis or Brönstedt bases and F) polysiloxane compounds.

16 Claims, No Drawings

β-KETO-ESTER-ESTERIFIED POLYOL WITH POLYMERIZED MONOMERS

The invention relates to a two-component binder suitable for coating-agent compositions.

DE-A-37 13 511 describes two-component lacquer binding agents based on methacrylic acid-2-acetoacetoxy-ethyl esters and reaction products thereof with aldehydes or ketones and amines. These systems however harden very slowly at room temperature.

EP-A-0 160 824 describes two-component lacquers based on reaction products of compounds containing CH-acid groups with olefinically unsaturated compounds. These systems harden inadequately at room temperature and are therefore unsuitable for repair lacquering in the motor-vehicle sector in workshops which do not have any stoving equipment.

Two-component coating agents hardenable by heating and based on CH-acid compounds and compounds containing at least two α,β-unsaturated groups are described in EP-A-0 224 158. The CH-acid compounds used in the citation contain methane tricarboxylic acid amide groups. These systems likewise harden inadequately at room temperature.

EP-A-0 203 296 describes an isocyanate-free two-component binder system based on the reaction of olefinically unsaturated compounds with blocked polyamines. This system can be hardened at room temperature but is slow to harden and becomes resistant to petrol. There is no mention of catalysis with Lewis bases.

DE-A-39 32 517 describes cross-linking of acryloyl-unsaturated binders with enamine-functionalised cross-linking agents. These systems are inadequate as patching or filler materials, since they cannot harden in a few minutes at room temperature.

DE-41 37 613 describes cross-linking of CH-acids and α,β-unsaturated binders with polyamines, the hardening process being additionally catalysed with Lewis bases. The resulting films can be ground or polished more quickly, but there is a problem with adhesion to substrates such as iron or zinc.

The object of the invention is to prepare a binder composition suitable for producing coating agents which can be rapidly hardened at low temperature, e.g. room temperature, to form films with good hardness and resistance to water and solvents, and very firm adhesion to metal substrates.

It has been found that this problem can be solved by a binder composition constituting one subject of the invention and containing $A_1$) 5–75 wt. % of a C—H acid compound obtainable by radical polymerisation of one or more hydroxy-functional and non-hydroxyfunctional ethylenically unsaturated monomers in the presence of polyols, e.g. diols, triols and/or higher-functional polyols, which can optionally be partly or completely esterified with one or more β-keto carboxylic acids (wherein the subsequent transesterification takes place only with the hydroxyl groups of the polymer when the polyol is completely esterified), and one or more aliphatic β-keto carboxylic acid esters and subsequent trans-esterification of the hydroxy groups in the polymer and polyols with the contained aliphatic β-keto carboxylic acid esters, $A_2$) 0–60 wt. % of a C—H acid compound obtainable by transesterification of one or more polyols, e.g. diols, triols and/or higher functional polyols, with one or more aliphatic β-keto carboxylic acid esters, B) 5–75 wt. % of one or more α,β-unsaturated compounds with at least two groups having the general formula $$R_1R_2C=CR_3-CO-,$$

bonded via the radical of a dihydric or polyhydric alcohol or a diamine or polyamine or amino alcohol to at least one additional group $R_1R_2C=CR_3-CO-$, wherein $R_1$, $R_2$ and $R_3$ independently denote a hydrogen atom and/or a straight or branched alkyl radical with 1 to 10 carbon atoms, optionally containing one or more olefinically unsaturated parts and/or one or more hydroxyl groups, C) 2–40 wt. % of one or more polyglycidyl compounds, e.g. di-, tri- or higher functional polyglycidyl compounds, D) 5–70 wt. % of a hardener in the form of one or more polyamines with at least two primary and/or secondary amine functions, which can be masked, in the molecule and E) 0.01–10%, relative to the total weight of components $A_1$, $A_2$, B, C, D and F, of a catalyst in the form of a Lewis or Brönstedt base, the conjugated acids in the latter substance having a pKA value of at least 10, and F) 0.01–10 wt. % of one or more polysiloxane compounds having the general formula:

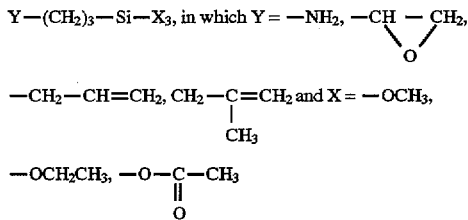

wherein a number of groups X can be the same or different.

It has surprisingly been found that the binder composition according to the invention can very easily be worked and can be dispersed without difficulty with conventional lacquer pigments and fillers.

The binder according to the invention can contain organic solvents and/or water, the organic solvents being e.g. residual solvents from manufacture or from subsequent addition to obtain advantageous viscosities in use. These solvents can e.g. be those mentioned hereinafter for manufacturing the coating agents.

It is preferable, however, to use a substantially solvent-free binder without an organic solvent or optionally water, in order to avoid film shrinkage, which is very disturbing particularly when the binder is used as a patching compound.

The CH-acid component $A_1$ according to the invention can be manufactured by radical polymerisation of hydroxy-functional and non-hydroxyfunctional ethylenically unsaturated monomers in the presence of polyols, which can optionally be partly or completely esterified with one or more aliphatic β-keto carboxylic acid esters, and one or more aliphatic β-keto carboxylic acid esters and subsequent esterification of the hydroxy groups in the polymer and the polyols with the contained aliphatic β-keto carboxylic acid esters. The polyols include diols, triols and higher polyols and mixtures thereof.

In the process, for example, one or more polyols, e.g. diols or triols such as neopentyl glycol or trimethylol propane dissolved in the β-keto carboxylic acid ester, e.g. acetoacetic ester, are placed in a reactor and heated. Temperatures of e.g. 100° to 180° C., e.g. 130° C., are suitable. The hydroxyfunctional and non-hydroxy-functional monomers such as hydroxyethyl acrylate, butyl acrylate and/or styrene and an initiator or initiator mixture such as tert. butyl perbenzoate can then be added to the solution.

Optionally also, modifiers such as dodecane thiol or α-dimeric styrene, can be added. This is also a means, if required, of adding di- and triacrylic monomers such as dipropylene glycol diacrylate. These monomers are preferably used in portions up to 20 wt. %, e.g. 2 to 20 wt. %, of the total ethylenically unsaturated monomers. The addition can be made during a period of a number of hours, e.g. 3 to 6 hours, e.g. 5 hours. This can be followed by further polymerisation, e.g. for a number of hours, e.g. 1 to 3, e.g. 2 hours. Advantageously the mixture is stirred. The reaction temperature is in the previously-given range, e.g. 130° C. The resulting alcohol is then distilled off by heating the solution, the temperature being continuously increased, and finally the excess β-keto carboxylic acid ester can be distilled off in vacuo.

The following are examples of suitable β-keto carboxylic acid esters: esters of acetoacetic acid or alkyl-substituted acetoacetic acids such as α and/or γ-methyl acetoacetic acid. Suitable esters of these acids are esters with aliphatic alcohols, preferably lower alcohols with 1 to 4 carbon atoms such as methanol, ethanol or butanol.

Hydroxyfunctional ethylene unsaturated monomers with primary and/or secondary OH groups are suitable for manufacturing the component $A_1$. The following are examples of suitable monomers with primary hydroxy groups: hydroxyalkyl esters of α,β-unsaturated carboxylic acids such as acrylic acid and/or methacrylic acid containing a $C_2$–$C_3$-hydroxyalkyl radical with a primary OH group such as hydroxyethyl(meth)-acrylate or hydroxypropyl(meth) acrylate, or hydroxyalkyl esters of α,β-unsaturated carboxylic acids such as acrylic acid and/or methacrylic acid comprising a $C_4$–$C_{18}$-hydroxyalkyl radical with a primary OH group such as butane diol mono(meth)acrylate, hydroxyhexyl(meth)acrylate, hydroxyoctyl(meth)acrylate and reaction products of hydroxyethyl(meth)acrylate with caprolactone. The expression "(meth)acrylic" used here is synonymous with "acrylic and/or methacrylic".

The monomers with secondary OH groups can e.g. be hydroxyl propyl(meth)acrylate, adducts of glycidyl(meth) acrylate and saturated short-chain fatty acids with $C_1$–$C_3$-alkyl radicals, e.g. acetic acid or propionic acid, or adducts of glycidyl esters of strongly branched monocarboxylic acids (the glycidyl ester of versatic acid is obtainable under the trade name Cardura E) with unsaturated COOH-functional compounds such as acrylic or methacrylic acid, maleic acid, crotonic acid, adducts of Cardura E with unsaturated anhydrides such as maleic acid anhydride, reaction products of glycidyl(meth)acrylate containing saturated branched or unbranched fatty acids with $C_4$–$C_{20}$ alkyl radicals such as butanoic acid, caproic acid, lauric acid, palmitic acid, stearic acid or arachidonic acid. The acrylic acid or methacrylic acid can be reacted with the glycidyl ester of a carboxylic acid containing a tertiary α-carbon atom before, during or after polymerisation.

The monomers can contain one or more hydroxy groups; for example they can contain primary and secondary hydroxy groups in common.

In addition to hydroxy-functional monomers, use can be made of monomers with other functional groups such as carboxy-functional, epoxy-functional or amino-functional polymerisable monomers.

The following are examples of suitable carboxyl group-containing monomers: unsaturated carboxylic acids such as acrylic, methacrylic, itaconic, crotonic, isocrotonic, aconitic, maleic and fumaric acid, semiesters of maleic and fumaric acid or β-carboxyethyl acrylate and adducts of hydroxyalkyl esters of acrylic acid and/or methacrylic acid with carboxylic acid anhydrides such as phthalic acid mono-2-methacryloyloxy ethyl ester, or semiesters of maleic acid anhydride by addition of saturated aliphatic alcohols such as ethanol, propanol, butanol and/or isobutanol.

Glycidyl(meth)acrylate, 1,2-epoxybutyl acrylate or 2,3-epoxy cyclopentyl acrylate are examples of epoxy-functional monomers. Other copolymerisable glycidyl monomers are e.g. (meth)allyl glycidyl ethers or 3,4-epoxy-1-vinyl cyclohexane.

Another alternative is to use (meth)acrylic monomers with terminal tert. amino groups. Tert. amino methyl methacrylate or tert.-aminopropyl methacrylate are examples of such monomers. Glycidyl-functionalised monomers should not be used at the same time as the last-mentioned monomers, since otherwise the polymer may gel.

In addition to functionalised monomers, non-functionalised monomers can be copolymerised.

Examples thereof are long-chain, branched or unbranched unsaturated monomers such as alkyl(meth)acrylates with $C_8$–$C_{18}$ chains in the alkyl part, e.g. ethylhexyl(meth) acrylate, octyl(meth)acrylate, 3,5,5-trimethylhexyl(meth) acrylate, decyl(meth)acrylate, dodecyl(meth)acrylate, hexadecyl(meth)acrylate, octodecyl(meth) acrylate, lauryl acrylate-1214, isobornyl(meth)acrylate or 4-tert. butyl cyclohexyl methacrylate. Other examples are short-chain or medium-chain branched or unbranched unsaturated monomers such as alkyl(meth)acrylates with $C_1$–$C_7$ chains in the alkyl part, e.g. methyl(meth)acrylate, ethyl(meth)acrylate, propyl(meth)acrylate, butyl(meth)-acrylate, isopropyl(meth) acrylate, isobutyl(meth)-acrylate, tert.butyl(meth)acrylate, pentyl(meth)-acrylate, hexyl(meth)acrylate, cyclohexyl (meth)-acrylate, 2-ethylhexyl(meth)acrylate, octyl(meth)-acrylate, 3,5,5-trimethylhexyl(meth)acrylate, decyl(meth) acrylate, dodecyl(meth)acrylate, hexadecyl(meth)acrylate, octadecyl(meth)acrylate or octadecenyl(meth)acrylate.

Other ethylenically unsaturated monomers for producing (meth)acrylic copolymers can be used instead of the previously-mentioned alkyl esters of acrylic and methacrylic acid or together with these alkyl esters, the choice of such monomers being largely dependent on the desired properties of the coating agent with regard to hardness, elasticity, compatibility and polarity.

Monovinyl aromatic compounds are an example of another suitable component. Preferably they contain 8 to 10 carbon atoms per molecule. The following are examples of suitable compounds: styrene, vinyl toluenes, α-methyl styrene, chlorostyrenes, o-, m- or p-methyl styrene, 2,5-dimethyl styrene, p-methoxystyrene, p-tert.butylstyrene, p-dimethyl aminostyrene, p-acetamidostyrene or m-vinyl phenol. Vinyl-toluenes and particularly styrene are preferably used.

The following are examples of other suitable ethylenically unsaturated monomers: the alkyl esters of maleic, fumaric, tetrahydrophthalic, crotonic, isocrotonic, vinyl-acetic and itaconic acid, e.g. the corresponding methyl, ethyl, propyl, butyl, isopropyl, isobutyl, pentyl, amyl, isoamyl, hexyl, cyclohexyl, 2-ethylhexyl, octyl, 3,5,5-trimethyl hexyl, decyl, dodecyl, hexadecyl, octadecyl and octadecenyl esters.

Manufacture is preferably in the form of radical polymerisation in the presence of radical initiator as is well known to the person skilled in the art. The following are examples of radical initiators: dialkyl peroxides such as di-tert.-butyl peroxide or di-cumyl peroxide; diacyl peroxides such as di-benzoyl peroxide or dilauroyl peroxide;

hydroperoxides such as cumene hydroperoxide or tert.butyl hydroperoxide; peresters such as tert. butyl perbenzoate, tert. butyl perpivalate, tert. butyl-per-3,5,5-trimethyl hexanoate or tert. butyl-per-2-ethyl hexanoate; peroxide dicarbonates such as di-2-ethyl hexyl peroxydicarbonate or dicyclohexyl peroxydicarbonate; perketals such 1,1-bis-(tert.butylperoxy)-3,5,5-trimethyl cyclohexane, 1,1-bis-(tert.butylperoxy)-cyclohexane; ketone peroxide such as cyclohexanone peroxide, methyl isobutyl ketone peroxide and azo compounds such as 2,2'-azo-bis-(2,4-dimethyl valeronitrile), 2,2'-azo-bis(2-methyl butyronitrile), 1,11-azo-bis-cyclohexane carbonitrile, azo-bis-isobutyronitrile or C—C-splitting initiators such as benzopinakol derivatives.

The polymerisation initiators are usually added e.g. in the proportion of 0.1 to 4 wt. % relative to the weighed amount of monomers.

In a preferred embodiment of the invention the polyols used in β-keto carboxylic acid ester solution as the basis for polymerisation, are monomers and polymers selected from:

a) Polyols from the group of straight, branched or cyclic alkane diols and polyols with 2 to 30 carbon atoms, the alkane radicals being optionally interrupted by one or more heteroatoms such as oxygen atoms and/or containing one or more aromatic radicals. Pure alkane diols and polyols preferably have 2 to 12 carbon atoms.

b) Hydroxyl group-containing poly(meth)acrylates or poly(meth)acrylic amides based on (meth)acrylic acid hydroxyalkyl esters or (meth)acrylic acid hydroxyalkyl amides each with 2 to 12 carbon atoms in the alkyl part, optionally copolymerised with α,β-unsaturated monomers, with a number average molecular weight (Mn) of 1000 to 10000, c) Hydroxyl group-containing poly(meth)acrylates based on (meth)acrylic acid hydroxyalkyl esters with 2 to 12 carbon atoms in the alkyl part and optionally copolymerisable α,β-unsaturated monomers modified with cyclic esters of hydroxy-carboxylic acids with 4 to 6 carbon atoms, with a number average molecular weight (Mn) of 1000 to 10000 and d) Polyester polyols, polyether polyols and/or polyurethane polyols, each with a number average molecular weight (Mn) of 200 to 2000, e.g. 500 to 2000.

Examples of alkane diols and polyols in group a) contain at least two hydroxy groups, preferably at least three. The following are special examples thereof: propanediol, butanediol, hexanediol, glycerol, trimethylol propane, pentaerythritol and cyclohexane-1,4-diol, and the reaction products of hydrogenated and non-hydrogenated bisphenol A with ethylene oxide and/or propylene oxide.

The following are examples of hydroxyl group-containing poly(meth)acrylates b) based on (meth)acrylic acid hydroxyalkyl esters with 2 to 12 carbon atoms in the alkyl part: hydroxyalkyl esters of acrylic acid or methacrylic acid containing alcohols with at least two hydroxyl groups such as 1,4-butanediol-mono(meth)acrylate, 1,6-hexanediol-mono(meth)acrylate or 1,2,3-propanetriol mono(meth)acrylate. The following are examples of hydroxyl group-containing poly(meth)acrylic amides b) based on (meth)acrylic acid hydroxyalkyl amides: amides of acrylic acid or methacrylic acid with hydroxyalkyl amines or di(hydroxyalkyl) amines each with 2 to 12 carbon atoms in the alkyl part, optionally containing one or more hydroxyl groups, such as acrylic acid hydroxyethyl amide. The expression "(meth)acrylic" used in the present description and claims means "and/or methacrylic".

The hydroxyl group-containing poly(meth)acrylates in component b) can be homopolymers or copolymers. They preferably have a number average molecular weight of 1000 to 10000, particularly preferably 3000 to 6000. The copolymerisable monomers for producing the copolymers can e.g. be α,β-unsaturated monomers or radically polymerisable monomers from the group of esters of α,β-unsaturated carboxylic acids, e.g. acrylic acid or methacrylic acid, the alkyl components of the esters being e.g. methyl, ethyl or propyl alcohol or isomers and higher homologues thereof. Other examples are diesters of maleic or fumaric acid, the alcohol component being the same as previously mentioned. Other examples are vinyl aromatic compounds such as styrene, α-methyl styrene or vinyl toluene. Other examples are vinyl esters of short-chain carboxylic acids such as vinyl acetate, vinyl propionate or vinyl butyrate.

The hydroxyl group-containing poly(meth)acrylates in the previously defined component c) can e.g. be modified poly(meth)acrylate homopolymers and copolymers as described under b), the hydroxyl groups wherein are partly or completely reacted with cyclic esters, e.g. of hydrocarboxylic acids with 4 to 6 carbon atoms such as butyrolactone or caprolactone. The resulting modified poly(meth) acrylates in component c) preferably have a number average molecular weight Mn of 1000 to 10000.

The polyester polyols and polyether polyols in component d) can e.g. have a number average molecular weight Mn of 200 to 2000, e.g. 500 to 2000. Special examples are reaction products of di- or tricarboxylic acids such as adipic acid or trimellitic acid with polyols, the polyols being present in excess. Other examples are reaction products of diols or triols, such as propanediol, butanediol or glycerol, with ethylene oxide or propylene oxide. Use can also be made of monoacids such as isononanoic acid or monoalcohols such as hexanol.

The polyurethane polyols in component d) can e.g. have a number average molecular weight Mn of 200 to 2000, e.g. 500 to 2000. Special examples are reaction products of diols and triols such as propanediol, butanediol or glycerol with di-, tri- and/or polyisocyanates such as isophorone diisocyanate or hexamethylene diisocyanate isocyanurate. In this case the alcohol component must be present in excess.

The polyols can be partly or completely esterified with β-keto carboxylic acids. This can be brought about e.g. by transesterification with aliphatic β-keto carboxylic acid esters, e.g. as previously described in the manufacture of the CH-acid component A1.

Catalysts can also be added in order to accelerate the esterification reaction after the polymerisation process in the polyol β-keto carboxylic acid ester solution. The catalysts can e.g. be acids such as formic acid or p-toluene sulphonic acid. During the transesterification reaction, the temperature is advantageously increased continuously (e.g. in steps of 10° C. per 20 minutes) until the temperature is slightly (about 10° C.) below the boiling point of the β-keto carboxylic acid ester. After quantitative transesterification, the excess β-keto carboxylic acid ester is removed, e.g. in vacuo. The mixture can then be cooled and adjusted to a desired content of solids, using an inert solvent.

The proportions of the individual components for producing the component A1 can be chosen e.g. as follows: for example 5 to 65 wt. % of the hydroxyfunctional ethylenically unsaturated monomers can be used together with 95 to 35 wt. % of the ethylenically unsaturated non-hydroxyfunctional monomers, these percentages adding up to 100 wt. %. Preferably in the process, the OH number of the polymers obtained by polymerisation together with the polyols present before transesterification with the β-keto carboxylic acid esters is 50 to 450 mg KOH/g. During transesterification with the β-keto carboxylic acid esters, the OH groups in the polymer and polyols can be esterified up to 100%. Preferably 50 to 100% of the OH groups present are esterified.

In order to adjust the viscosity, the binder compositions according to the invention can also contain one or more reactive diluents, e.g. 2-acetoacetoxy-ethyl methacrylate or the glycidyl ester of versatic acid (Cardura® E made by Messrs Shell).

Other binder components $A_2$ can be CH-acid compounds obtained by transesterification of polyols, e.g. diols, triols and/or higher polyols, with one or more aliphatic β-keto carboxylic acid esters. The transesterification reaction can occur e.g. as described hereinbefore in the case of component $A_1$. The β-keto carboxylic acid esters can be the compounds mentioned in the description of component $A_1$. The compounds a) and d) in the description of component $A_1$ are examples of diols, triols or higher polyols which can be chosen for manufacture of component $A_2$.

Another component B) used in the binder compositions according to the invention is a compound containing at least two unsaturated functional groups having the general formula (I)

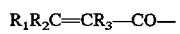

$$R_1R_2C=CR_3—CO—$$

wherein $R_1$, $R_2$ and $R_3$ are defined as previously.

The group having the general formula (I) in component B) can be derived from a mono- or polyunsaturated monocarboxylic acid, e.g. with 2 to 10, preferably 3 to 6 carbon atoms, such as cinnamic acid, crotonic acid, citraconic acid, mesaconic acid, dihydrolaevulinic acid, sorbic acid, preferably acrylic acid and/or methacrylic acid.

These groups can be interconnected via short or long-chain radicals, oligomers and/or polymers of dihydric or polyhydric alcohols, diamines or polyamines or amino alcohols, the oligomers and polymers having a number average molecular weight Mn of e.g. 1000 to 10000. The oligomers and polymers can e.g. be saturated and/or unsaturated polyethers, polyesters or polyurethanes containing two or more hydroxyl groups, e.g. based on maleic acid, phthalic acid and diols, or acrylic acids containing hydroxyl groups, aliphatic or preferably aromatic epoxy resins optionally containing hydroxy groups, e.g. based on diphenylol propane and/or methane, hydantoin and/or amine resin. The radical in the general formula (I) can be combined in ester-like manner, e.g. by addition of acrylic or methacrylic acid or derivatives thereof to epoxy groups of epoxy resin or by esterification on hydroxyl groups of polyols. The following are examples of suitable polyhydric alcohols: alkane diols and alkane triols with 2 to 8 carbon atoms such as ethane diol, the various propane, butane, hexane and octane diols or their homologues, the corresponding oligomeric ethers, glycerol, trimethylol ethane or trimethylol propane, hexane triol, pentaerythritol, dipentaerithritol, sorbitol or polyvinyl alcohol.

The groups having the general formula (I) can also be connected via NH groups and/or OH groups to polyamines containing at least two NH groups or at least one NH group and at least one OH group. The starting compounds containing NH groups and used for the aforementioned compounds can e.g. be diamines or polyamines such as alkylene diamines and oligomers thereof such as ethylene diamine, propylene diamine, diethylene triamine, tetramines and higher homologues of these amines, or amino alcohols such as diethanolamine or the like. The amines can also be e.g. aminocarboxylic acid esters of polyhydric alcohols. The compound with NH groups can e.g. be acrylic or methacrylic acid polyamides or polyurethanes, e.g. polyisocyanates masked in the form of polyurethane groups, e.g. groups obtained by reaction of hydroxyethyl acrylate with polyisocyanates, amine resins such as methoxy melamines, preferably hexamethylol melamine, or urea resins, the radical having the general formula (I) and with the grouping —CO— being bonded in amide form to the amine groups on these compounds. If these amine compounds have OH groups or hydroxyalkyl groups, alternatively the formula I radical can be bonded to these compounds in ester-like manner or via an ether group. A hydroxyalkyl ester or a hydroxyalkyl amide of an unsaturated acid such as acrylic acid can be used for ether bonding of the formula (I) radical.

Another possibility is to link the formula (I) groups via polyisocyanates, such as adducts of copolymers of the compound α-dimethyl-m-isopropenyl benzyl isocyanate (hereinafter always called m-TMI) with hydroxy(meth) acrylic monomers. The comonomers which can be used for manufacture of the copolymers with m-TMI are e.g. conventional esters of (meth)acrylic acid as already mentioned when illustrating the polyols. The hydroxy(meth)acrylic monomers used for adduct formation are e.g. hydroxyethyl (meth)acrylate, hydroxypropyl(meth)acrylate or butanediol monoacrylate. Another alternative is to use addition products of hydroxyethyl methacrylate to caprolactone.

Component B) can be solvent-free or can contain residual solvents from manufacture, e.g. aliphatic and/or aromatic hydrocarbons. The content of solids can be adjusted to desired values, e.g. by removing residual solvent, e.g. by distillation or by addition of water or solvents which are required for subsequent preparation of coating agents and are described hereinafter. Preferably the same solvent is used as for component A). In that case the statement "5 to 75 wt. % of component B)" in the binder composition according to the invention relates to the weight of solids in component B).

Another component C) can comprise di-, tri- or higher polyglycidyl compounds. These are epoxy-functional compounds with at least two epoxy groups in the molecule, more particularly with a number average molecular weight (Mn) of 200 to 10000 g/mol.

The following are examples: conventional di- or polyepoxides such as polyglycidyl ethers based on diethylene glycol, dipropylene glycol or polypropylene glycol with a number average molecular weight (Mn) up to 2000, triglycidyl ethers of glycerol and/or di- or polyphenols such as bisphenol A.

Other examples of di- or polyepoxides are based on di- or polyglycidyl esters. The following are examples: reaction products of 1-hydroxy-2,3-epoxypropane with phthalic or terephthalic acid to phthalic or terephthalic acid-bis(2,3-epoxypropylester) or a diglycidyl ether of bisphenol A with trimellitic acid anhydride to polyesters with a number average molecular weight (Mn) of 500 to 2000.

Other usable examples are glycidyl-functionalised (meth) acrylic copolymers. Examples thereof are copolymers of glycidyl(meth)acrylate or 2,3-epoxycyclopentyl acrylate. The comonomers can e.g. be esters of (meth)acrylic acid such as methyl, ethyl, butyl, isobutyl, ethylhexyl, cyclohexyl and/or lauryl(meth)acrylate, hydroxy-functionalised esters of (meth)acrylic acid such as hydroxyethyl and/or hydroxypropyl esters, or styrene, vinyl toluene and/or s-methyl styrene or all α,β-unsaturated monomers as previously described in the case of component $A_1$). The number average molecular weight (Mn) can e.g. be between 1000 and 10000, preferably about 2000 to 5000. The following are other examples of copolymerisable glycidyl monomers: (meth) allyl glycidyl ether or 3,4-epoxy-1-vinyl cyclohexane. Copolymers are manufactured by radical polymerisation in solution.

The component D) in the binder composition is a polyamine component, e.g. with at least two functional groups in the form $R^4HN-$, wherein $R^4$ is a hydrogen atom or a straight or branched alkyl radical with 1 to 10 carbon atoms or a cycloalkyl radical with 3 to 8, preferably 5 or 6 carbon atoms.

Suitable polyamines are diamines or amines with more than two amino groups, the amino groups being primary and/or secondary. The polyamines can also e.g. be adducts consisting of polyamines with at least two primary amino groups and at least one, preferably one, secondary amino group, with epoxy compounds, polyisocyanates and acryloyl compounds. Amino amides and adducts of carboxy-functionalised acrylates with imines containing at least two amino groups are also suitable.

Examples of suitable diamines and polyamines are described e.g. in EP-A-0 240 083 and EP-A-0 346 982. Examples thereof are aliphatic and/or cycloaliphatic amines with 2 to 24 carbon atoms, containing 2 to 10 primary amino groups, preferably 2 to 4 primary amino groups and 0 to 4 secondary amino groups. The following are representative examples: ethylene diamine, propylene diamine, butylene diamine, pentamethylene diamine, hexamethylene diamine, 4,7-dioxydecane-1,10-diamine, 1,2-diaminocyclohexane, 1,4-diaminocyclohexane, isophorone diamine, diethylene triamine, dipropylene triamine, 2,2-bis-(4-aminocylohexyl) propane; polyether polyamines, e.g. those commercially known as "Jeffamine®" made by Jefferson Chemical Company, bis-(3-aminopropyl) ethylamines, 3-amino-1-(methylamino)propane and 3-amino 1(cyclohexylamino)-propane.

Use can be made of polyamines based on adducts of polyfunctional amine components with di- or polyfunctional epoxy compounds, manufactured e.g. by using di- or polyfunctional epoxy compounds such as diglycidyl or polyglycidyl ethers of (cyclo)aliphatic or aromatic hydroxy compounds such as ethylene glycol, glycerol, 1,2- or 1,4-cyclohexane diol, bisphenols such as bisphenol A, polyglycidyl ethers of phenol formaldehyde novolaks, polymers of ethylenically unsaturated groups containing epoxy groups such as glycidyl(meth)acrylate, N-glycidyl(meth)acrylamide and/or allyl glycidyl ether, optionally copolymerised with various other ethylenically unsaturated monomers, glycidyl ethers of fatty acids with 6 to 24 carbon atoms, epoxidised polyalkadienes such as epoxidised polybutadiene, hydantoin epoxy resins, glycidyl group-containing resins such as polyesters or polyurethanes containing one or more glycidyl groups per molecule, and mixtures of the aforementioned resins and compounds.

The polyamines are added to the aforementioned epoxy compounds by opening the ring of the oxirane grouping. The reaction can be brought about at a temperature of e.g. 20° to 100° C., preferably between 20° and 60° C. Optionally 0.1–2 wt. % of a Lewis base such as triethylamine or an ammonium salt such as tetrabutyl ammonium iodide can be used as catalyst.

The following isocyanates can be used for manufacturing the polyamine component based on polyamine-isocyanate adducts: aliphatic, cycloaliphatic and/or aromatic di-, tri- or tetraisocyanates, which can be ethylenically unsaturated. The following are examples: 1,2-propylene diisocyanate, trimethylene diisocyanate, tetramethylene diisocyanate, 2,3-butylene diisocyanate, hexamethylene diisocyanate, 2,2,4-trimethyl hexamethylene diisocyanate, 2,4,4-trimethyl hexamethylene diisocyanate, ωω'-dipropyl ether diisocyanate, 1,3-cyclopentane diisocyanate, 1,2- and 1,4-cyclohexane diisocyanate, isophorone diisocyanate, 4-methyl-1,3-diisocyanate cyclohexane, transvinylidene diisocyanate, dicyclohexyl methane-4,4'-diisocyanate, 3,3'-dimethyl-dicyclohexyl methane-4,4'-diisocyanate, toluylene diisocyanate, 1,3-bis(1-isocyanato-1-methyl ethyl) benzene, 1,4-bis(1-isocyanato-1-methyl ethyl)-benzene, 4,4'-diisocyanato diphenyl, 3,3'-dichloro-4,4'-diisocyanato diphenyl, adducts of 2 mols of a diisocyanate, e.g. hexamethylene diisocyanate or isophorone diisocyanate, to 1 mol of a diol, e.g. ethylene glycol, the adduct of 3 mols of hexamethylene diisocyanate to 1 mol water (obtainable under the trade name Desmodur N from Bayer AG), the adduct of 1 mol trimethylol propane and 3 mols toluidene diisocyanate (obtainable under the trade name Desmodur L from Bayer AG) and the adduct of 1 mol trimethylol propane and 3 mols isophorone diisocyanate.

Polyamines are added to the aforementioned isocyanate compounds at temperatures e.g. from 20° to 80° C., preferably 20°–60° C. Optionally the reaction can be catalysed by adding 0.1 to 1 wt. % of a tertiary amine such as triethylamine and/or 0.1–1 wt. % of a Lewis acid such as dibutyl tin laurate.

Examples of di- or polyfunctional acryloyl-unsaturated compounds for producing polyamine adducts are described in U.S. Pat. No. 4,303,563, e.g. ethylene glycol diacrylate, diethylene glycol diacrylate, trimethylene glycol diacrylate, 1,3-butylene glycol diacrylate, 1,6-hexamethylene glycol diacrylate, trimethylol propane diacrylate, pentaerythritol tetra-acrylate or pentaerythritol triacrylate. The following are other examples of polyfunctional acryloyl-unsaturated acrylates:

1) Urethane acrylates obtained by reaction of an isocyanate group of a polyisocyanate with a hydroxyacrylate, e.g. hexamethylene diisocyanate or hydroxyethylene acrylate; manufacture is described in U.S. Pat. No. 3,297,745, 2) Polyether acrylates obtained by transesterification of a hydroxy-terminated polyether with acrylic acid, described in U.S. Pat. No. 3,380,831, 3) Polyester acrylate, obtained by esterification of a hydroxyl group-containing polyester with acrylic acid, described in U.S. Pat. No. 3,935,173, 4) Polyfunctional acrylates obtained by reaction of a hydroxyl-functionalised acrylate such as hydroxyethyl acrylate with
   a) dicarboxylic acids with 4 to 15 carbon atoms,
   b) polyepoxides with terminal glycidyl groups,
   c) polyisocyanates with terminal isocyanate groups, described in U.S. Pat. No. 3,560,237, 5) Acrylate-terminated polyesters, obtained by reacting acrylic acid, a polyol with at least three hydroxy groups and a dicarboxylic acid, described in U.S. Pat. No. 3,567,494, 6) Polyacrylate, obtained by reacting acrylic acid with an epoxidised oil containing epoxy groups, such as soyabean oil or linseed oil, described in U.S. Pat. No. 3,125,592, 7) Polyacrylate, obtained by reacting acrylic acid with epoxy groups of a diglycidyl ether of bisphenol A, described in U.S. Pat. No. 3,373,075, 8) Polyacrylate obtained by reacting acrylic acid on an epoxy-functionalised vinyl polymer, e.g. polymers with glycidyl acrylate or vinyl glycidyl ether, described in U.S. Pat. No. 3,530,100, 9) Polyacrylate, obtained by reaction of acrylic acid anhydride with polyepoxides, described in U.S. Pat. No. 3,676,398, 10) Acrylate urethane ester, obtained by reaction of a hydroxyalkyl acrylate with a diisocyanate and a hydroxyl-functionalised alkyd resin, described in U.S. Pat. No. 3,676,140, 11) Acrylate urethane polyester, obtained by reaction of a polycaprolactone diol or triol with an organic polyisocyanate and with a hydroxyalkyl acrylate, described in U.S. Pat. No. 3,700,634, and 12) Urethane polyacrylate, obtained by reaction of a hydroxy-functionalised polyester with acrylic acid and a polyisocyanate, described in U.S. Pat. No. 3,759,809.

The acryloyl terminal groups of the di- or polyacrylic monomers or the polyacrylates in Examples 1) to 12) can be functionalised with polyamine. The addition can be brought about at a temperature of 20° to 100° C., preferably 40° to 60° C.

Another method of synthesising an amine-functionalised hardener is described in EP-A-2801, where acrylic acid ester copolymers are amidised with diamines, splitting off alcohol. The resulting reactive group has the following structure:

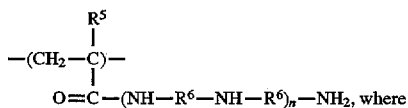

$O=C-(NH-R^6-NH-R^6)_n-NH_2$, where $R^5$=H or $CH_3$, $R^6$=alkylene groups with 2 to 3 carbon atoms, which can be the same or different and n=0, 1, 2, or 3 and the radical

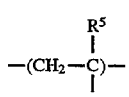

originates from the acrylic acid ester copolymer framework.

The acrylic acid ester copolymer has a number average molecular weight Mn of 1000–20000, preferably 2000–5000. The following are examples of possible comonomers: esters of (meth)acrylic acid, e.g. methyl-, ethyl-, butyl-, or cyclohexyl(meth)acrylate, hydroxyethyl (meth)acrylate, hydroxypropyl(meth)acrylate, or (meth) acrylic acid, styrene or vinyl toluene.

Methyl acrylate is particularly preferred, since this monomer is particularly easily accessible for aminolysis. The proportion of methyl acrylate in the copolymer is e.g. 2–35 wt. %. The copolymer is produced by polymerisation in solution in conventional solvents such as toluene, xylenes, acetates, e.g. butyl acetate or ethyl glycol acetate, ethers such as tetrahydrofuran or mixtures of aromatics such as the commercial product Solvesso 100. Synthesis of the copolymers is known to the person skilled in the art and needs no further explanation. The polyamines used in aminolysis must contain at least two primary or secondary amine groups as previously described.

Other possible hardeners are products of a reaction between a (meth)acrylic acid copolymer and alkylene imines as described in EP-A-0 179 954. The resulting functional groups have the structure:

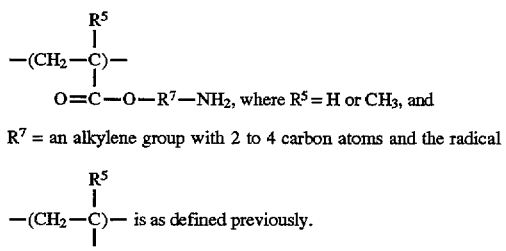

$O=C-O-R^7-NH_2$, where $R^5$= H or $CH_3$, and $R^7$ = an alkylene group with 2 to 4 carbon atoms and the radical $-(CH_2-C(R^5))-$ is as defined previously.

In addition to (meth)acrylic acid, the copolymer can contain esters of (meth)acrylic acid or vinyl compounds such as styrene. Examples of usable comonomers have already been described when defining the hydroxyl group-containing poly(meth)acrylates b). Propylene or butylene imines are examples of alkylene imines.

The polyamines of use as hardeners according to the invention can also be those produced by reacting copolymers of α-dimethyl-m-isopropenyl benzyl isocyanate (TMI), having a number average molecular weight (Mn) of e.g. 1000 to 10000, with mono- or diketimines containing either an OH or a sec. NH grouping.

The comonomers for producing the TMI copolymers can be any conventional vinyl-polymerisable monomers without OH groups, such as esters of (meth)acrylic acid, e.g. methyl, ethyl, butyl, isobutyl, ethyl hexyl, cyclohexyl and/or lauryl (meth)acrylate, or styrene, vinyl toluene and/or methyl styrene. The copolymers can be produced e.g. by conventional radical polymerisation in solution as known to the person skilled in the art. Operation is preferably in aprotic organic solvents such as toluene or xylene, or esters such as butyl acetate.

Conventional radical initiators such as peroxides or azo compounds are normally used for this purpose. The reaction is brought about e.g. with heating, e.g. to temperatures of 80° to 140° C.

The monomeric TMI can be copolymerised in a range from 2 to 40 wt. %, relative to the weight of all the monomers, preferably in a range from 5 to 25 wt. %.

The isocyanate-terminated copolymer is then reacted with one or more mono- and/or diketimines functionalised with OH or sec. NH and/or mono- and/or dialdimines.

The ketimines and/or aldimines (hereinafter for simplicity the expression "ketimines" will be used, but is also meant to include aldimines) are manufactured e.g. by reacting alkanolamines or di- or triamines containing at least one primary amino group, or an additional secondary amine group in the case of diamines or triamines, with aldehydes and/or ketones, with splitting-off of water.

The following are examples of alkanolamines:

Monoethanolamine, monopropanolamine, monohexanolamine or 2-amino-2-hydroxypropane.

The following are examples of di- or triamines bearing at least one primary amino group and one secondary amino group:

N-methyl propylamine, diethylene triamine, dipropylene triamine or bishexamethyl triamine.

In order to manufacture the TMI-acrylate/ketimine adducts, the primary amino groups of the aforementioned amines are blocked.

The primary amines are reacted with aldehydes or ketones, with splitting off of water, to form Schiff's bases or aldimines or ketimines. The following are examples of such aldehydes and ketimines:

$C_3$–$C_{10}$ compounds such as hexyl aldehyde, octyl aldehyde, diisopropyl ketone and/or methyl isobutyl ketone.

The last two compounds are particularly preferred because they have only a slight tendency to side-reactions.

The OH or sec. NH-functionalised mono- or diketimines, when added to the isocyanate-terminated copolymers, are preferably used in sub-stoichiometric proportions; preferably 90–95% of the isocyanate groups are reacted with OH or NH groups. The remaining excess isocyanate groups, in a last reaction step, are urethanised with a monoalcohol such as ethanol, propanol or butanol.

The ketimine or aldimine-functionalised (masked) polyamines are synthesised e.g. by first producing a TMI copolymer by radical polymerisation in solution. Next, an alkanolamine or di- or triketimine containing at least one primary and one secondary amino group is placed together with the aldehyde or ketone, the desired blocking agent, in an organic solvent which forms an azeotropic mixture with water. The water resulting from the reaction is azeotropically distilled off by heating this mixture.

Advantageously manufacture is under inert gas. An excess of blocking agent can be used and distilled off after the reaction. Advantageously the masking agent is a ketone/aldehyde which itself forms an azeotropic mixture with water, avoiding the need for an additional organic solvent. In order to add the OH or sec.-NH functionalised ketimine or aldimine to the isocyanate-terminated copolymer, the ketimine is placed under an inert gas, e.g. at 80° C., and the copolymer is added in e.g. 2 hours. The reaction can optionally be catalysed with a Lewis acid such as dibutyl tin laurate. After the substances have been added, an alcohol such as butanol can be added if there is insufficient ketimine. Optionally the mixture is additionally agitated at elevated temperature, e.g. from about 10 to 30 minutes.

The preceding method of manufacture is only one example of a process. Alternatively the copolymer can be provided and the ketimine can be added.

The terminated (free) amino groups in the polyamine hardener component D) can be masked, e.g. with ketone or aldehydes, to form Schiff's bases.

All the previously-described polyamines are very reactive towards the binder component according to the invention, which results in a very short pot life. For this reason it may be advantageous to react the terminated amino groups in the aforementioned polyamines with aldehydes or ketones, with separation of water, to form Schiff's bases or aldimines or ketimines. The following are examples of aldehydes and ketones for use in masking: $C_3$–$C_{10}$ compounds such as hexyl aldehyde, octyl aldehyde, diisopropyl ketone and/or methyl isobutyl ketone. The last two compounds are particularly preferred, since they have only a slight tendency to side-reactions.

The catalysts for component E) can be mixed in component D). The catalysts are in the form of Lewis bases or Brönstedt bases, the conjugated acids in the latter substance having a pKA value of at least 10. Component E) can consist of one or more catalysts. Lewis bases have been found particularly suitable, e.g. those in the group of cycloaliphatic amines such as diazabicyclooctane (DABCO), tert.-aliphatic amines such as triethyl amine, tripropyl amine, N-methyl diethanolamine, N-methyl diisopropyl amine or N-butyl diethanolamine, or amidines such as diazabicycloundecene (DBU) or guanidines such as N,N,N',N'-tetramethyl guanidine. Other examples are alkyl or aryl-substituted phosphanes such as tributyl phosphane, triphenyl phosphane, tris-p-tolyl phosphane, methyl-diphenyl phosphane or hydroxy and amine-functionalised phosphanes such as tris-hydroxymethyl phosphane or tris-dimethyl aminoethyl phosphane.

The following are examples of usable Brönstedt bases: alcoholates such as sodium or potassium ethylate, quaternary ammonium compounds such as alkyl, aryl or benzyl ammonium hydroxides or halides such as tetraethyl or tetrabutyl ammonium hydroxide or fluoride, or trialkyl or triaryl phosphonium salts or hydroxides.

The proportion of catalysts is usually 0.01 to 5 wt. % preferably 0.02 to 2 wt. % relative to the total content of solids in components $A_1$, $A_2$, B, C, D and F.

Siloxane compounds having the general formula

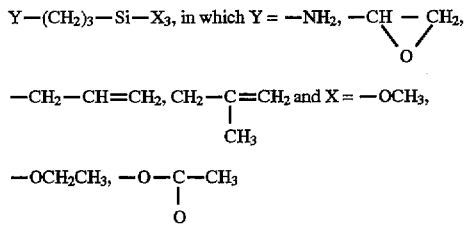

wherein a number of groups X can be the same or different, constitute another component F). The following are examples of such siloxane compounds: amine-functionalised siloxanes, such as 3-aminopropyl-trimethoxy silane, N-methyl-3-aminopropyl-trimethoxy silane, 3-aminopropyl-triethoxy silane, N-aminoethyl-3-aminopropyl-methyl-dimethoxy silane, N-aminoethyl-3-aminopropyl-trimethoxy silane, 3-aminopropyl-methyl-diethoxy silane or 3-aminopropyl-tris(2-methoxy-ethoxy-ethoxy) silane, epoxy-functional siloxanes such as 3-glycidyl oxypropyl-trimethoxy silane, vinyl-unsaturated siloxanes such as vinyl trimethoxy silane, vinyl triethoxy silane, vinyl-tris(2-methoxy-ethoxy) silane or 3-methacrylic oxypropyl-trimethoxy silane, mercapto-functional siloxanes such as 3-mercaptopropyl-trimethoxy silane, 3-mercaptopropyl-methyl-dimethoxy silane or 3-mercaptopropyl-triethoxy silane; other possible siloxanes are 3-chloropropyl trimethoxy silane, vinyl trichlorosilane, triamino functional propyl trimethoxy silane, 3,4,5-dihydroxyimidazole-1-yl propyl triethoxy silane or 3-ureidopropyl triethoxy silane.

The binder compositions according to the invention are "two-component" systems.

Preferably components $A_1$, $A_2$, B and C are stored together as the binder component 1 and components D and E are stored together as the hardener component 2. Component F is added to component 1 or 2, depending on the functionality.

This means that components 1 and 2 are stored separately and are not mixed until before use or e.g. for producing coating agents. The binder compositions according to the invention can be formulated in conventional manner to obtain coating agents, e.g. fillers. This is usually done by addition of solvents or water. A mixture of components 1 and 2 can be prepared and converted into coating agents in conventional manner by addition of solvents or water and conventional additives. Another alternative is first to prepare component 1 or component 2 by addition of solvents or water and conventional additives and then to add the other component.

The organic solvents for producing coating agents, e.g. lacquers, are those also used in the manufacture of the individual components $A_1$, $A_2$, B and D. The solvents can e.g. be organic, e.g. aliphatic or aromatic hydrocarbons, e.g. toluene, xylene, mixtures of aliphatic and/or aromatic hydrocarbons, esters, ethers and alcohols. These are conventional lacquer solvents. Aqueous solutions can also be prepared from the binders according to the invention for producing the coating agents. Suitable emulsifiers can optionally be used for this purpose, as is conventional in the lacquer sector.

In order to produce the coating agents, conventional additives can be used, as is conventional e.g. in the lacquer sector. The additives can e.g. be pigments, e.g. transparent or covering and colouring pigments such as titanium dioxide or carbon black or decorative pigments such as metal-scale and/or nacreous pigments.

The binder compositions according to the invention are particularly advantageous for coating agents containing the aforementioned decorative pigments. Preferably they contain decorative pigments together with transparent colouring pigments or covering colouring pigments together with fillers.

Other examples of additives are fillers such as talc or silicates; plasticisers, light-shielding agents, stabilisers or levelling agents such as silicone oils.

The coating agents made from the binders according to the invention can be given the desired viscosity for application by suitably controlling the addition of solvents and/or additives.

The coating agents can have pot lives adjusted to between a few seconds and a few hours, depending on the proportion of component 1 to component 2, the equivalent weight and the amount of catalyst.

The resulting coating agents can be applied in conventional manner, e.g. by immersion, spraying, painting or electrostatically.

The coats made from the coating agents can be hardened over a wide temperature range of e.g. −10° C. to 200° C. A temperature range of 5° C. to 80° C., e.g. 20° to 80° C. e.g. room temperature, is preferred. Hardening can be assisted by high-energy radiation, e.g. infrared or UV radiation.

The coating agents made from the binders according to the invention are suitable for coats which adhere to a number of substrates such as wood, textiles, plastics, glass, ceramics or particularly metal. The coating agents can also be used in a multi-layer process. For example they can be applied to conventional primers, base lacquers, fillers or existing covering varnishes, and can also be covered by lacquer. A number of layers can also be applied wet-on-wet, using the coating agents according to the invention, and hardened simultaneously.

A particularly preferred application of the binders according to the invention is in the preparation of coating agents for lacquers in the motor vehicle sector. The coating agents produced from the binders according to the invention harden under advantageous conditions, and are therefore particularly suitable also for vehicle repair lacquers.

The invention accordingly relates also to methods of producing coats on various substrates, wherein a coating agent made from the binders according to the invention is applied to the substrate, dried and hardened. The invention also relates to use of the binder compositions according to the invention in patching compositions, fillers or covering lacquers.

In every case, coating agents made from the binders according to the invention produce films with good hardness and good resistance-to water and solvents, more particularly resistance to petrol, with very firm adhesion. Hardening occurs very quickly; e.g. thorough hardening within a few minutes, e.g. 5 minutes, at room temperature, which is e.g. particularly advantageous for use of patching compounds and fillers, which can quickly be ground or polished.

The following examples illustrate the invention. All parts (German abbreviation (T)) and percentages (%) are by weight.

EXAMPLE 1

1) Production of an Acetoacetic Ester-functionalised Acrylate (Component A1)

a) Production of acrylate 1a 95 parts of trimethylol propane and 1100 parts of acetoacetic acid were heated to 130° C. in a 4-liter three-necked flask equipped with agitator, thermometer, dripping funnel and reflux condenser. Within 5 hours a mixture of 75 parts butyl-acrylate, 115 parts hydroxyethyl methacrylate, 455 parts styrene, 85 parts α-methyl styrene dimer and 35 parts Trigonox 21 S were continuously added. Next, the monomer vessel and the dripping funnel were rinsed with 45 parts acetoacetic ester and the entire mixture was additionally polymerised at 130° C. for 1 hour. 470 parts of propoxylated bisphenol were then added and the batch was heated to 180° within 2 hours, with separation of the liberated solvent. Within a further 2 hours, the remaining solvent was distilled off at 180° C. in vacuo. After the batch had cooled to 70° C., 45 parts of a 4% hydroquinone solution in acetoacetic ester and 1480 parts of trimethylol propane triacrylate (component B) were added. The result was an almost 100% resin with a viscosity of approx. 1200 mPas.

b) Production of the Intermediate Product for Acrylate 1c 255 parts of trimethylol propane and 745 parts acetoacetic acid were heated to 180° C. in a 1-liter three-necked flask equipped with agitator, thermometer and a separator, with separation of the evolved solvent ethanol. After the temperature of 180° C. had been reached, a negative pressure was applied until all the solvent had distilled off. The intermediate product, which had low viscosity at room temperature, was immediately ready for further processing.

c) Production of Acrylate 1c 550 parts of the intermediate product for acrylate 1c and 225 parts of acetoacetic acid were heated to 130° C., using the reflux condenser, in a 4-liter three-necked flask equipped with agitator, thermometer, dripping funnel and reflux condenser. Within 5 hours a mixture of 150 parts butyl acrylate, 225 parts hydroxyethyl methacrylate, 900 parts styrene, 167 parts α-methyl styrene dimer and 64 parts Trigonox 21 S were continuously added. Next, the monomer vessel and the dripping funnel were rinsed with 64 parts acetoacetic acid and the entire mixture was polymerised for an additional hour at 130° C. The batch was then heated to 180° C. within 2 hours, with separation of the liberated solvent. Within a further 2 hours, the remaining solvent was distilled off in vacuo at 180° C. After the batch had cooled to 70° C., 85 parts of a 4% hydroquinone solution in acetoacetic ester and 1570 parts of trimethylol propane triacrylate (component B) were added. The result was a nearly 100% resin with a viscosity of about 7600 mPas.

2) The Giycidyl Component (Component C)

Aromatic epoxy resin, trade name Epikote® 1001 by Messrs Shell, 50% in trimethylol propane triacrylate.

3) The Polyamine Component (Component D)

Commercial cycloaliphatic amine, amine number 235 to 295 mg KOH/g, viscosity 250 to 500 mPas (adduct of bisphenol A and isophorone diamine).

4) Catalyst (Component E)

Diazabicyclo (4.5.0) -undecene.

5) Polysiloxane Component (Component F)

3-aminopropyl-trimethoxysilane

I. Production of Patching Compounds

EXAMPLE 2

The following components (A, B+C) were mixed together and dispersed for 2 minutes:

31.6 parts of the acetoacetic ester-functionalised acrylate 1a 5.3 parts of Epikote 1001 50% in trimethylol propane triacrylate (component C)

5.3 parts titanium dioxide pigment (titanium R 611)

15.0 parts heavy spar and 42.8 parts talc (Finntalc® M40).

II. The following hardener components (D, E+F) were mixed:

3.0 parts of a commercial adduct of bisphenol A and isophorone diamine (component D)

0.2 parts of diazabicycloundecene (component E)

0.4 parts of aminopropyl trimethoxysilane (component F) and 0.4 parts of pyrogenic silicon dioxide (Aerosil® 300)

The two mixed components I and II were then intimately mixed together and could then be processed for 10 minutes. After half an hour the patching compound was dry when agitated, and could be polished after 1 hour. Adhesion to degreased sheet steel, tested 48 hours after application, was very good.

EXAMPLE 3

I. As in Example 2

III. The following hardener components (D+E) were mixed:

3.0 parts of a commercial adduct of bisphenol A and isophorone diamine (component D)

0.2 parts of diazabicycloundecene (component E) and 0.4 parts of pyrogenic silicon dioxide (Aerosil 300)

Components I and III were processed as in Example 2. It was found, however, that adhesion without the siloxane component was insufficient. The patching compound came loose from the sheet metal after slight stress through bending.

EXAMPLE 4

IV. The following components were mixed and dispersed for 2 minutes:

31.6 parts of the acetoacetic ester-functionalised acrylate 1a (component A, B)

5.3 parts of titanium dioxide pigment (titanium R 611)

15.0 parts of heavy spar and 42.8 parts of talc (Finntalc M 40)

II. As in Example 2

Without the glycidyl component C, the pigments in IV were more difficult to incorporate and disperse. There was also an adverse effect on adhesion of the patching compound to degreased heat steel.

EXAMPLE 5

The method was the same as in Example 2, except that 31.6 parts of acrylate 1a were replaced by the same quantity of acrylate 1b.

This patching compound, as before, could be processed for 10 minutes after mixing the components I and II and could be ground and polished after 1 hour. Adhesion to degreased sheet steel after 48 hours was also satisfactory.

We claim:

1. A binder composition containing $A_1$) 5–75 wt. % of one or more C—H acid compounds obtained by radical polymerisation of one or more hydroxyfunctional or non-hydroxy-functional ethylenically unsaturated monomers in the presence of one or more polyols and one or more aliphatic β-keto carboxylic acid esters, and subsequent transesterification of the hydroxy groups of the polymer and of the polyols with the contained aliphatic β-keto carboxylic acid esters, $A_2$) 0–60 wt. % of one or more C—H acid compounds obtained by transesterification of one or more polyols with one or more aliphatic β-keto carboxylic acid esters, B) 5–75 wt. % of one or more α,β-unsaturated compounds with at least two groups having the general formula

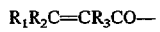

bonded via the radical of a dihydric or polyhydric alcohol or a diamine or polyamine or amino alcohol to at least one additional group $R_1R_2C$=$CR_3$—CO—, wherein $R_1$, $R_2$ and $R_3$ independently denote a hydrogen atom and/or a straight or branched alkyl radical with 1 to 10 carbon atoms, C) 2–40 wt. % of one or more polyglycidyl compounds, D) 5–70 wt. % a hardener in the form of of one or more polyamines with at least two amine functions, which are primary and/or secondary and can be capped, in the molecule, E) 0.01–10%, relative to the total weight of components $A_1$, $A_2$, B, C, D and F, of a catalyst in the form of a Lewis or Brönstedt base, the conjugated acids in the latter substance having a pKA value of at least 10, and F) 0.01–10 wt. % of one or more polysiloxane compounds having the general formula:

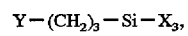

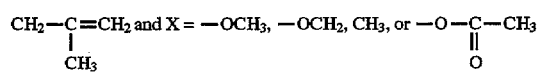

wherein a number of groups X can be the same or different.

2. A binder composition according to claim 1, wherein the polyol in component $A_1$ is selected from the group consisting of a) Polyols selected from the group consisting of straight, branched and cyclic alkane diols and polyols with 2 to 30 carbon atoms, b) Hydroxyl group-containing poly(meth)acrylates or poly(meth)acrylic amides polymerized from (meth)acrylic acid hydroxyalkyl esters or (meth)acrylic acid hydroxyalkyl amides each with 2 to 12 carbon atoms in the alkyl part, with a number average molecular weight (Mn) of 1000 to 10000, c) Hydroxyl group-containing poly(meth)acrylates polymerized from (meth)acrylic acid hydroxylalkyl esters with 2 to 12 carbon atoms in the alkyl part, with a number average molecular weight (Mn) of 1000 to 10000 and d) Polyester polyols, polyether polyols and/or polyurethane polyols, each with a number average molecular weight (Mn) of 200 to 2000.

3. A binder composition according to claim 1, wherein the hydroxyfunctional polyol in component $A_2$ is selected from the group consisting of a) Polyols selected from the group consisting of straight, branched and cyclic alkane diols and polyols with 2 to 30 carbon atoms, and b) Polyester polyols, polyether polyols and/or polyurethane polyols, each with a number average molecular weight (Mn) of 200 to 2000.

4. A binder composition according to claim 1 in solvent-free form.

5. A binder composition according to claim 1 in solvent-containing form.

6. A coating agent containing the binder composition according to claim 1 and also one or more organic solvents and/or water and/or at least one additive selected from the group consisting of pigments, fillers, plasticizers and levelling agents.

7. A patching compound or filler comprising a binder composition according to claim 1 in combination with organic solvents and/or water and/or at least one additive selected from the group consisting of pigments, fillers, plasticizers and levelling agents.

8. A coating agent comprising a binder composition according to claim 1 which is hardenable at temperatures of 5° to 80° C. in combination with conventional additives and solvents selected from organic solvents, water and a combination thereof.

9. A process for producing a multilayer lacquer coat comprising applying a coating agent according to claim 6 to a substrate, drying the coating agent, repeating the applying and coating steps at least once, and hardening the resulting dried multilayer coating.

10. A method according to claim 9 wherein the substrate is a motor-vehicle and the process is for repair or mass-production lacquering.

11. A binder composition according to claim 1, wherein the polyols are partly or completely esterified with one or more β-keto carboxylic acids and the subsequent transesterification takes place only with the hydroxyl groups of the polymer when the polyol is completely esterified.

12. A binded composition according to claim 1, wherein the straight or branched alkyl radical of component B contains one or more olefinically unsaturated parts and/or one or more hydroxyl groups.

13. A binder composition according to claim 2, wherein the alkyl radicals of the polyols of component a) are interrupted by one or more heteroatoms and/or one or more aromatic radicals.

14. A binder composition according to claim 2, wherein the poly(meth) acrylic or poly(meth) acrylic amides are polymerized from (meth)acrylic acid hydroxyalkyl esters or (meth) acrylic acid hydroxyalkyl amides and $\alpha,\beta$-unsaturated monomers.

15. A binder composition according to claim 2, wherein the poly(meth) acrylates are polymerized from the (meth) acrylic acid hydroxyalkyl esters and $\alpha,\beta$-unsaturated monomers modified with cyclic esters of dydroxy-carboxylic acids with 4 to 6 carbon atoms.

16. A binder composition according to claim 3, wherein the polyols of component a contained alkane radicals interrupted by one or more heteroatoms and/or one or more aromatic radicals.

* * * * *